United States Patent [19]
Wayne

[11] Patent Number: 5,323,812
[45] Date of Patent: Jun. 28, 1994

[54] PRESSURE-LOCKED COUPLING
[75] Inventor: Wilcox Wayne, Waterford, Pa.
[73] Assignee: Snap-Tite, Inc., Union City, Pa.
[21] Appl. No.: 132,100
[22] Filed: Oct. 5, 1993
[51] Int. Cl.⁵ ............................................. F16L 37/28
[52] U.S. Cl. ......................... 137/614.05; 137/614.03; 285/306; 285/316
[58] Field of Search .............. 137/614, 614.03, 614.05; 285/306, 316

[56] References Cited
U.S. PATENT DOCUMENTS 3,039,794  6/1962  De Cenzo ..................... 137/614.03
3,613,726  10/1971 Torres .......................... 137/614.03
4,865,292  9/1989  Ekman .......................... 251/149.6
4,924,909  5/1990  Wilcox .......................... 137/614.03
5,076,325  12/1991 Ekman .......................... 137/614.05

Primary Examiner—A. Michael Chambers
Attorney, Agent, or Firm—Woodling, Krost & Rust

[57] ABSTRACT

A pressure-locked coupling including a coupler and nipple, said coupler having a locking means which locks the nipple to said coupler in response to pressure applied to said coupler. A locking sleeve is employed having various locking diametrical surfaces and locking shoulders to secure said nipple to said coupler.

19 Claims, 7 Drawing Sheets

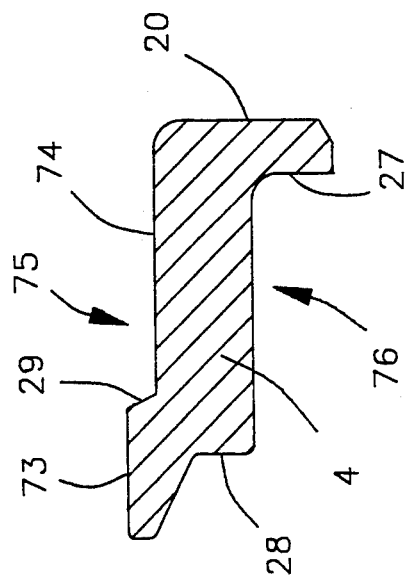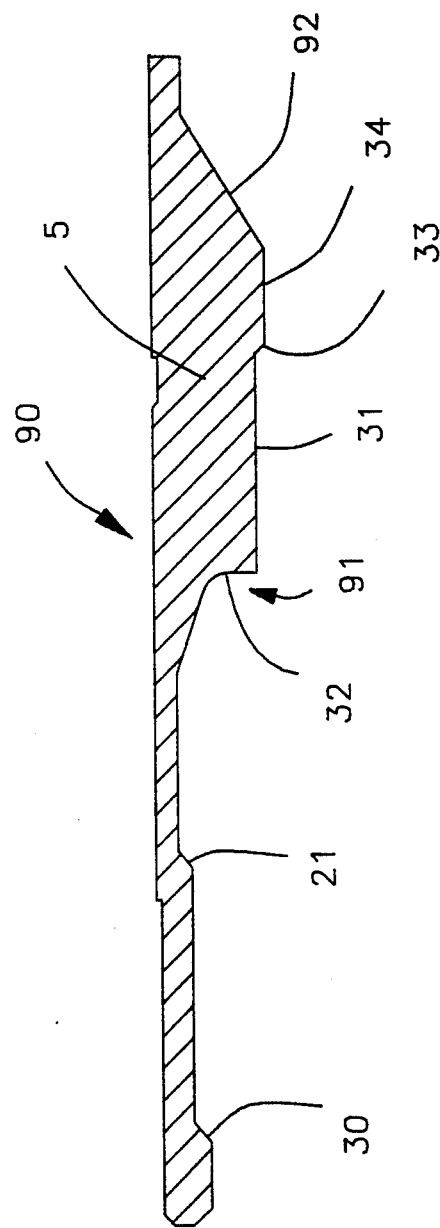

PRESSURE-LOCKED COUPLING

FIELD OF THE INVENTION

This invention relates to a pressure-locked coupling. Pressure in the coupler assists in securing same to the nipple to prevent separation of the coupling. The pressure-locked coupling prevents unintentional disconnection of the coupling, thus preventing the escape of the fluid (liquid or gas) being conducted by the coupling.

BACKGROUND OF THE INVENTION

It has become necessary in certain areas of the United States to switch from gasoline powered vehicles to either propane or natural gas powered vehicles. For instance, some portions of Southern California are so heavily plagued by smog that alternative fuels are being strongly pursued to reduce the problem.

Therefore, equipment is necessary to handle propane and natural gas. A need for securely coupling the source of the gas to the vehicle is necessary. The present invention satisfies that need. The present invention meets the Consolidated Natural Gas standards set for couplings used to transfer natural gas or propane.

OBJECTS OF THE PRESENT INVENTION

It is an object of the present invention to provide a coupling for use with gas delivery systems which is pressure-locked. This is accomplished when the coupler and nipple are engaged. Specifically, this is accomplished by pressure acting within the coupler on a certain pressure bearing surface of a retainer. The retainer forces a sliding sleeve of the coupler against the nipple. This causes a series of locking balls housed in a body of the coupler to engage a locking shoulder and a diametrical surface of a locking sleeve. The locking sleeve is part of the coupler.

It is a further object of the present invention to provide for a quick disconnection of the coupling. This is accomplished through the provision of a releasable locking sleeve. The locking sleeve is affixed to a bumper which is operable by hand to release the nipple from the coupler.

It is a further object of the present invention to provide a coupling in which a coupler valve in the coupler and a check valve in the nipple isolate the pressure supply source and pressure receiver, respectively, from the atmosphere when the coupling is not engaged.

It is a further object of the present invention to provide a coupling when the coupler and the nipple are engaged to sequentially lock under pressure and then open the check valve of the nipple.

It is a further object of the present invention to provide a coupling which meets or exceeds the standards set by the Consolidated Natural Gas industry for both disconnection force under pressure and for leakage.

BRIEF DESCRIPTION OF THE DRAWINGS

The structure, operation and advantages of the preferred embodiment of the invention will become further apparent upon consideration of the following description taken in conjunction with the accompanying drawings, wherein:

FIG. 1 is depicted prior to the application of the pressure source to the coupler. FIG. 1 shows the retainer of the coupler and the check valve of the nipple in their respective positions prior to the application of the pressure source. FIG. 1 shows a gap between the first shoulder of the retainer and the second shoulder of the body. FIG. 1 also shows a gap between the face of the retainer and the third shoulder of the sliding sleeve.

FIG. 2 depicts the coupler valve closed, the sliding sleeve, first and second balls, the locking sleeve and bumper in their positions prior to engagement with the nipple.

FIG. 3 illustrates the check valve spring operating on the check valve and a valve guide closing the check valve. Also, FIG. 3 illustrates the ball receiving notch on the exterior of the nipple.

FIG. 4 illustrates movement of the retainer of the coupler against the sliding sleeve which engages the nipple. This causes the balls to lock against the locking shoulder of the locking sleeve. FIG. 4 illustrates the elimination of the gap between the face of the retainer and the third shoulder of the sliding sleeve. Additionally, FIG. 4 illustrates a corresponding reduction of the gap between the first shoulder of the retainer and the second shoulder on the body.

FIG. 5 is an exploded cross-sectional view of the locking sleeve. FIG. 5 shows the various locking diametrical surfaces and locking shoulders located thereon.

FIG. 6 is an exploded cross-sectional view of the sliding sleeve.

FIG. 7 illustrates a gap between the retainer and the sliding sleeve.

FIG. 8 illustrates no gap between the retainer and the sliding sleeve.

DETAILED DESCRIPTION OF THE INVENTION

The pressure-locked coupling 68 includes a coupler 15 and a nipple 66. The coupler 15 is described first immediately below, followed by the description of the nipple. The description of the coupler and nipple engaged follows the description of the nipple.

Figure 7:
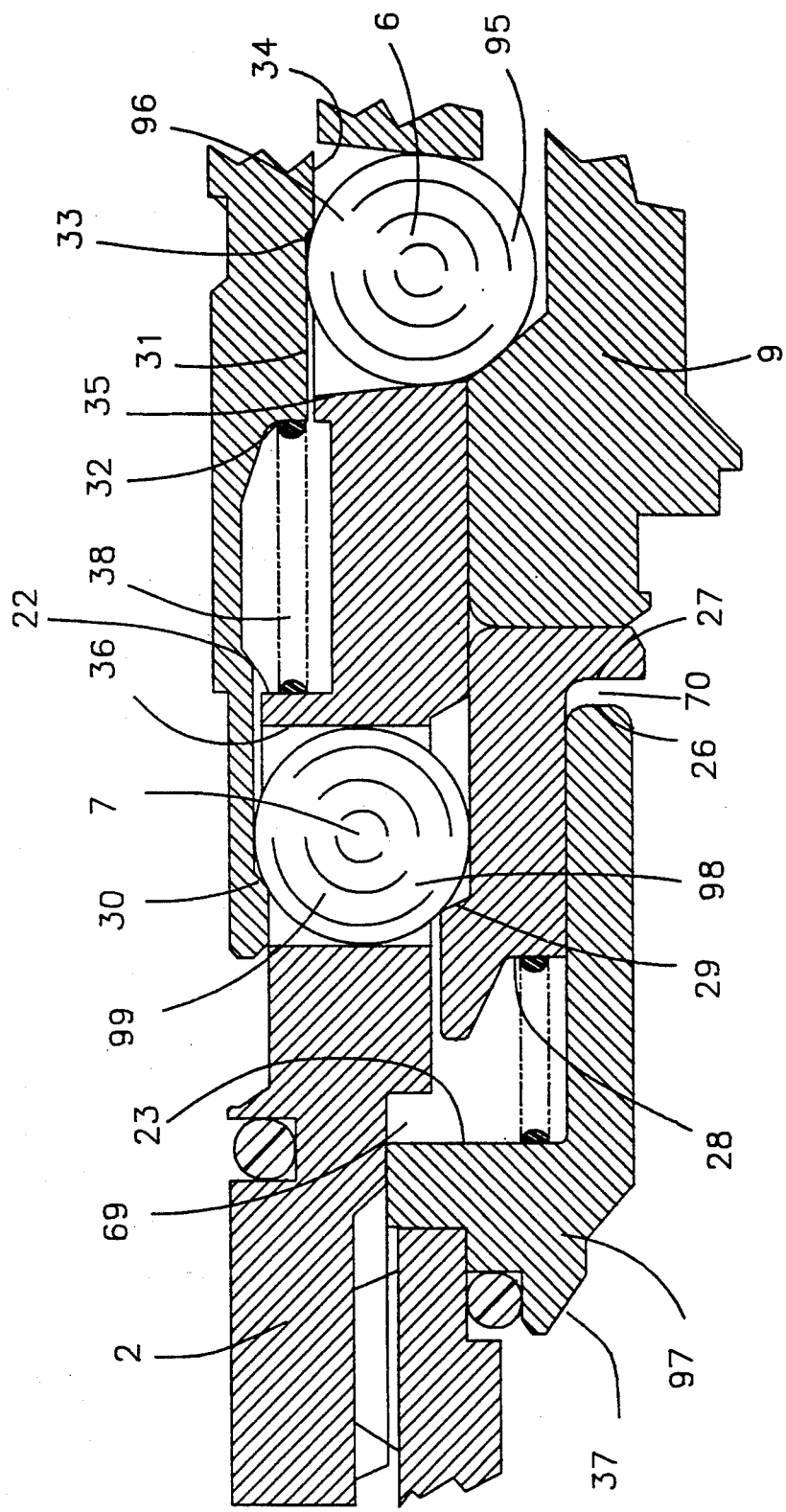
FIG. 7 is an exploded sectional view of the retainer, body, nipple, first and second balls.
Figure 8:
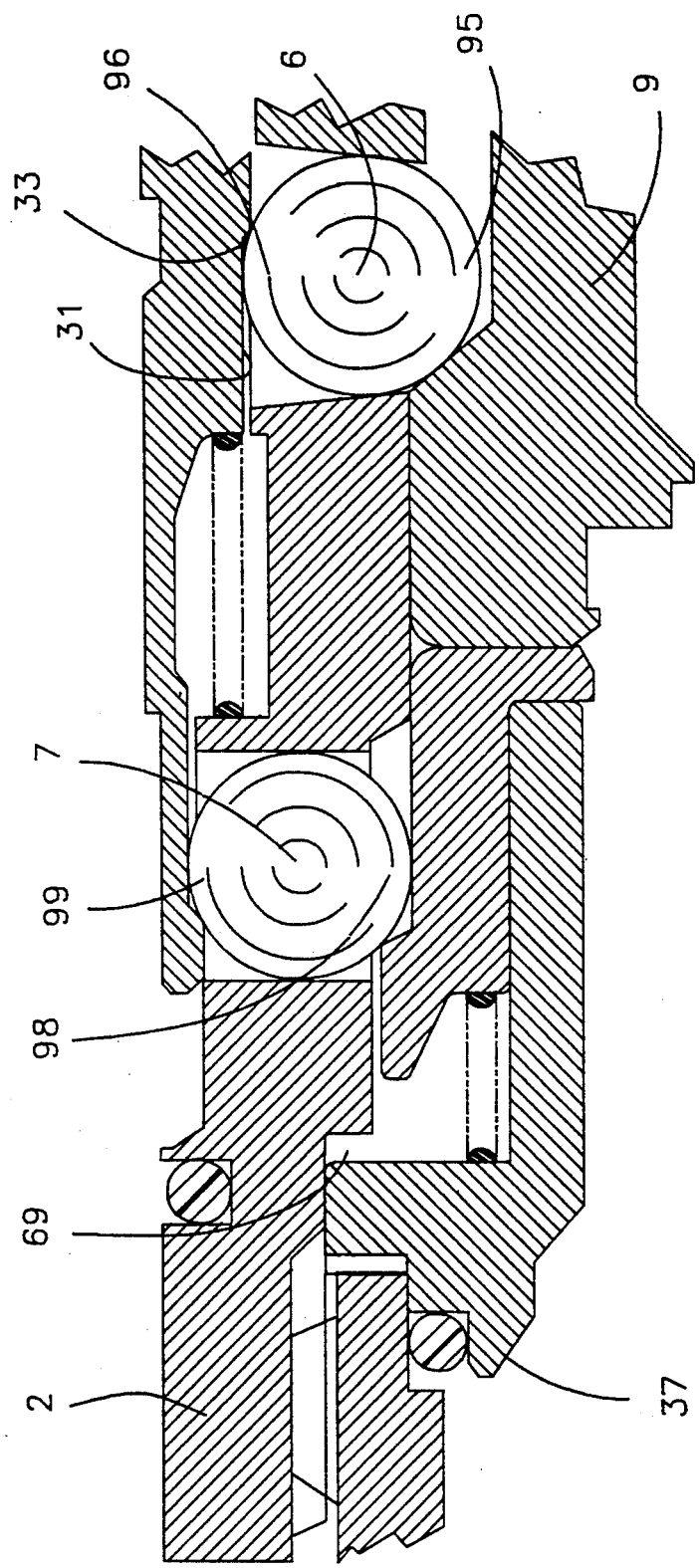
FIG. 8 is an exploded sectional view of the retainer, body, nipple, first balls and second balls similar to FIG. 7.

The coupler includes an adaptor 1, a coupler valve 12, a retainer 3, a sliding sleeve 4, a body 2, a locking sleeve 5, a bumper 8, first locking balls 6 and second locking balls 7. Body 2 has first 35 and second 36 ball housings located therein. First ball housings 35 are tapered conical bores. Second ball housings 36 are cylindrical bores. Additionally, there are a plurality of first 6 and second 7 balls residing in the first 35 and second 36 housings of the body 2. First and second balls 6 and 7 are sometimes referred to hereinafter as first and second ball detents. See, FIG. 2. First balls 6, or first ball detents 6 have a first portion 95 and a second portion 96. Second balls 7, or second ball detents 7, have a first portion 98 and a second portion 99. See, FIGS. 7 and 8.

Figure 2:
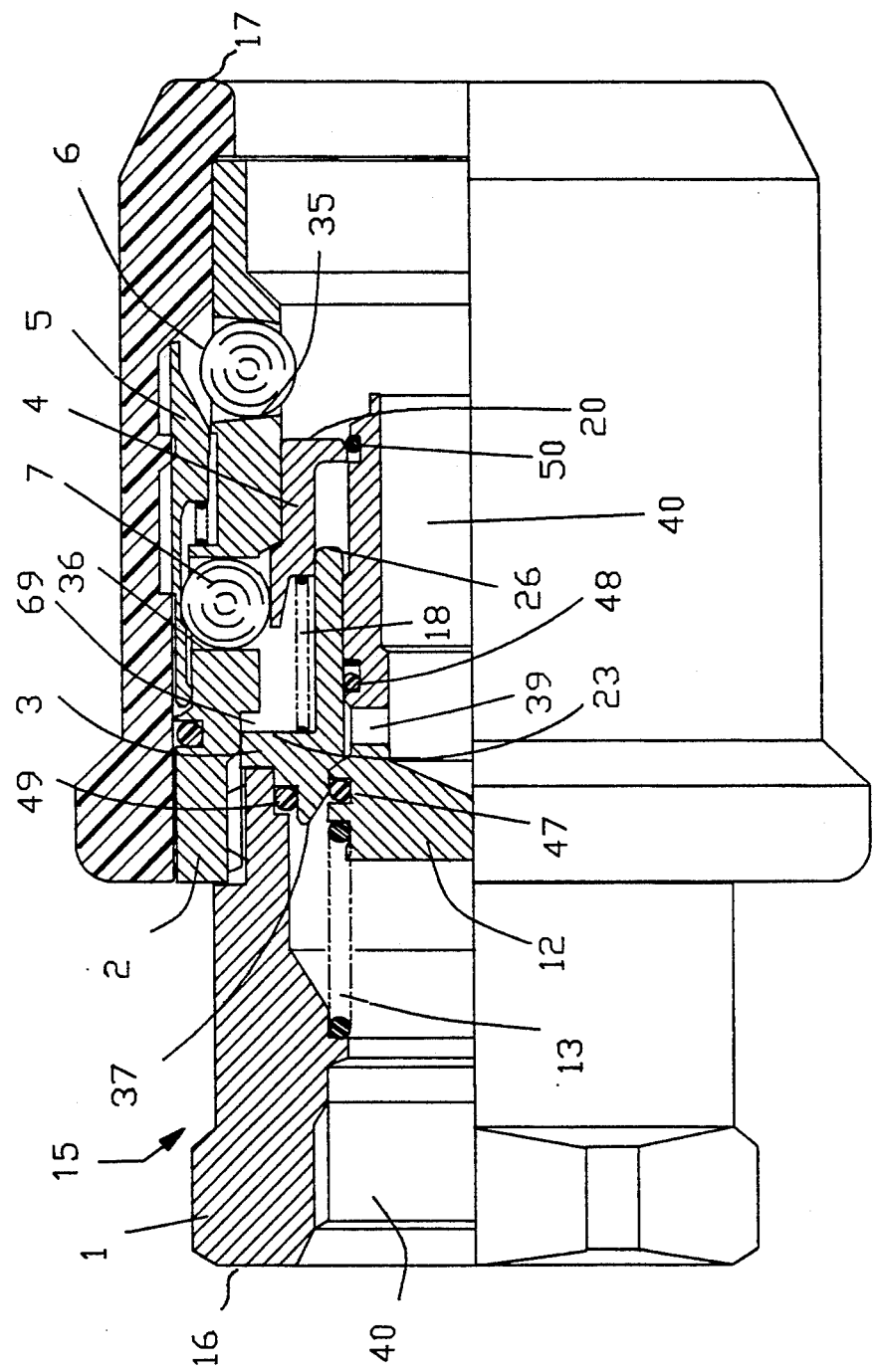
FIG. 2 is a half-sectional view of the coupler disengaged.

FIG. 2 illustrates the coupler disengaged. Balls 6 are restrained by the second ball housings 35 due to their tapered conical shape. Ball housings 35 prevent balls 6 from becoming free of the coupler. Sliding sleeve 4 restrains balls 7 during disengagement of the coupler and the nipple.

FIG. 6 illustrates the sliding sleeve 4, which is generally cylindrically shaped having an exterior portion 75 and an interior portion 76. The exterior portion 75 of the sliding sleeve 4 has a first plateau 73, a first shoulder 29, and a second plateau 74. The diameter of the first plateau 73 is larger than the diameter of the second plateau 74. The interior portion 76 of the sliding sleeve 4 has second 28 and third 27 shoulders. Additionally, the sliding sleeve has a face 20 which engages the nipple during coupling.

Retainer 3 has a first shoulder 23, a face 26, a second shoulder 24 and a pressure bearing surface 37. Coupler valve 12 has first 42 and second 41 end portions, respectively, ports 39, a valve seat 72, and a shoulder 43. Body 2 has a first shoulder 22, a second shoulder 19, and a third shoulder 71. Thread means 14 affix the body 2 to the adaptor 1.

Locking sleeve 5 is generally cylindrically shaped. Locking sleeve 5 has an exterior 90 and an interior 91. The locking sleeve 5 is affixed to bumper 8 by means of a press fit 51 residing on the exterior 90 of said locking sleeve 5. Bumper 8 facilitates easy uncoupling of the coupler and the nipple as will be discussed below.

The interior 91 of said locking sleeve has varying locking diameters and shoulders. The interior of the locking sleeve has a first locking shoulder 33, a second locking shoulder 30, and a spring engaging shoulder 32. The interior 91 of the locking sleeve also has a first diametrical locking surface 31 and a second diametrical locking surface 34. The first locking shoulder 33 has a height of approximately 0.015 inches in the preferred embodiment. In other words, there is a difference in the diameters of the first diametrical locking surface 31 and the second diametrical locking surface 34 of the preferred embodiment of approximately 0.015 inches. See FIG. 5.

Additionally, interior 91 of the locking sleeve 5 has first 92 and second 21 ball housing shoulders. Second ball housing shoulder 21 engages second balls 7 when the coupler is not engaged and assists in positioning the second balls 7 for locking against second locking shoulder 30 as is discussed below. See, FIG. 2.

The adaptor 1 has a first shoulder 45 and a second shoulder 46 located thereon. A sliding sleeve spring 18 is disposed between the first shoulder 23 of the retainer and the second shoulder 28 of the sliding sleeve. A locking sleeve spring 38 is disposed between the first shoulder 22 of the body and the spring shoulder 32 of the locking sleeve. A coupler valve spring 13 is disposed between the first shoulder 45 of the adaptor and the first shoulder 43 of the coupler valve 12.

FIG. 2 illustrates the coupler not engaged with the nipple. This condition of the coupler occurs before the coupler has been used with a nipple or after bumper 8 has been retracted by hand against the force of locking sleeve spring 38, pressure having first been relieved from the coupler. The retraction of bumper 8 and locking sleeve 5 is discussed in detail below.

When the coupling is disengaged, coupler valve 12 seats against retainer 3 to prevent flow therethrough. Specifically, valve seat 72 mates with a corresponding surface on the retainer 3 and O-ring seal 47 seals port 39 to prohibit flow. Coupler valve spring 13 urges coupler valve 12 toward the second end portion 17 of the coupler to the closed position. The movement of the coupler valve 12 toward the second end portion of the coupler is limited by retainer 3. See, FIG. 2. When coupler 15 is not engaged, retainer 3 is moveable to a position adjacent the second shoulder 46 of the adaptor 1 and remote from the second shoulder 19 of the body 2.

Retainer 3 will have a range of movement between shoulders 19 and 46. The pressure causing the movement would act upon the pressure bearing surface 37 of the retainer 3. The pressure source is connected to adaptor 1 and the pressure is present in the passageway 40.

Figure 1:
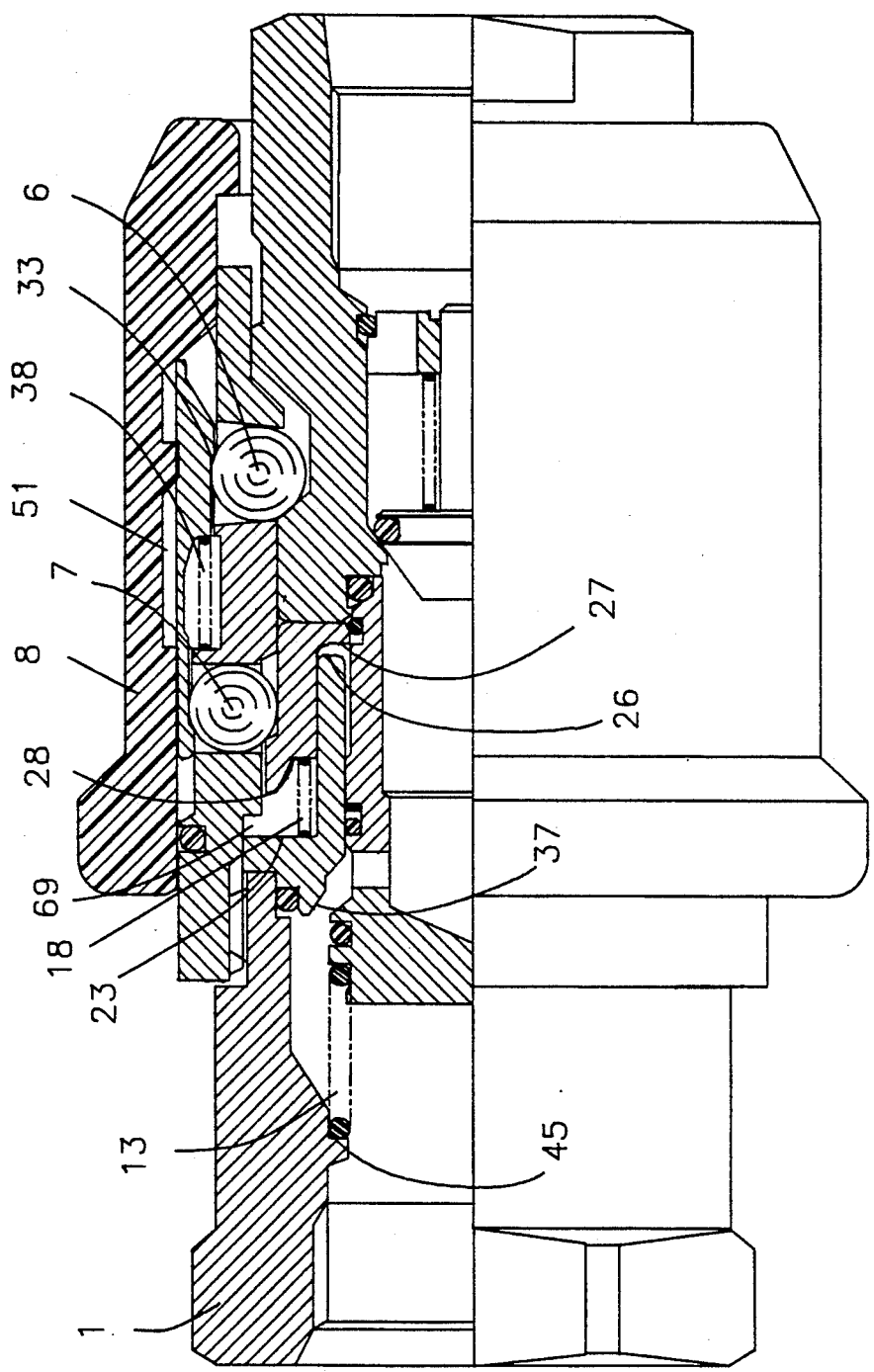
FIG. 1 is half-sectional view of the coupler and the nipple engaged.

FIG. 2 further illustrates the condition with no pressure applied to the coupler. A gap 69 exists between the first shoulder 23 of the retainer 3 and the second shoulder 19 of the body. In the preferred embodiment of the invention gap 69 is approximately 0.035 inches. FIG. 1, additionally, indicates the condition of the coupling with no or little pressure applied to the coupler. The gap 69 in FIG. 1, in the preferred embodiment, is 0.035 inches.

When uncoupled, sliding sleeve spring 18 urges sliding sleeve toward the second end portion of the coupler. First shoulder 29 of the sliding sleeve does not engage third shoulder 71 of the body as sliding sleeve 3 is restrained by snap ring 50. First plateau 73 of the sliding sleeve engages and supports second balls 7 against ball housing shoulder 21 and resists the force of locking sleeve spring 38. While uncoupled, first balls 6 have room to move freely in tapered ball housing 35 to the extent permitted by first ball housing shoulder 92 on locking sleeve 5.

Figure 4:
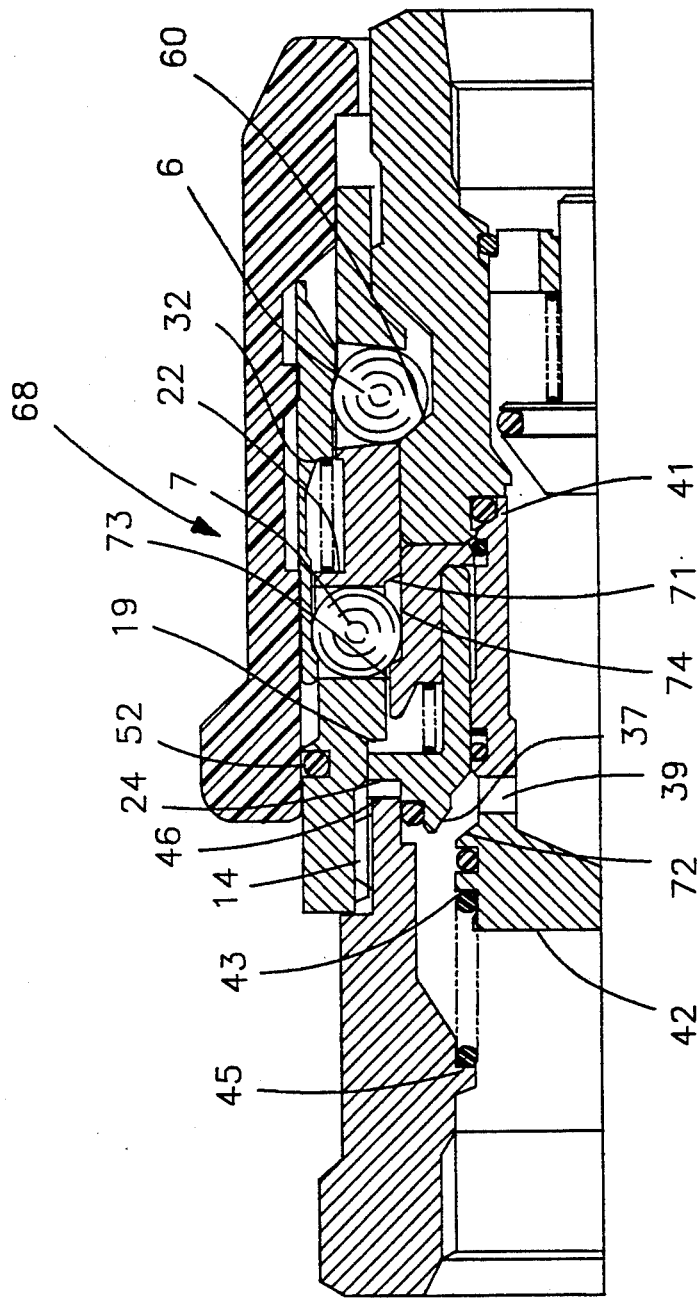
FIG. 4 is a half-sectional view as shown is FIG. 1 with pressure applied from the pressure source.

In addition to the coupler valve port seals 47 and 48 already discussed, the preferred embodiment employs 0-ring seals 49 and 52 as shown in FIGS. 1, 2, and 4 to ensure that no leakage occurs. The description of the nipple follows.

The nipple 66 includes a nipple body 9, a check valve 11, a check valve guide 10, a check valve spring 62, and a check valve guide clip 57. The nipple body 9 is generally cylindrically shaped and is adapted for insertion into the coupler 15. The nipple body has first 53 and second 54 end portions. The second end portion of the nipple includes a face 55 conjugate to face 20 of said sliding sleeve 4. See, FIG. 3.

Nipple body 9 includes an exterior surface 67. The exterior 67 of the nipple 9 has a circumferential locking notch 59. Circumferential locking notch 59 includes first 60, second 61 and third 80 walls. Nipple body 9 further includes a bore 56 therethrough. Bore 56 includes shoulder 77, valve seat 78, and an annular recess 79. See, FIG. 3.

Check valve 11 includes a face 81 and an annular recess 64. Check valve spring 62 is disposed between check valve guide 10 and check valve 11 and urges check valve 11 into a closed position where it is in engagement with valve seat 78. This occurs when the nipple is not engaged with the coupler or while engaged and when there is insufficient pressure on the face 81 of the check valve as will be described below. Nipple member 9 has a bore 56 therethrough. Shoulder 77 protrudes into the bore 56 sufficiently to engage coupler valve 12 as will be described below. O-ring seals 65 and 63 reside in annular recesses 79 and 64, respectively. O-ring seal 63 seals against valve seat 78 ensuring that no flow of gas or fluid will leak to the environment from the receiver when the nipple is not engaged with the coupler. Similarly, O-ring seal 65 seals between coupler valve 12 and nipple body 9 during engagement of the nipple and the coupler. The O-ring seals employed in the present invention are preferably elastomeric seals. However, those skilled in the art may substitute other seals without deviating from the intent of the subject invention. The description of the nipple and the coupler engaged follows. See, FIG. 3.

Figure 3:
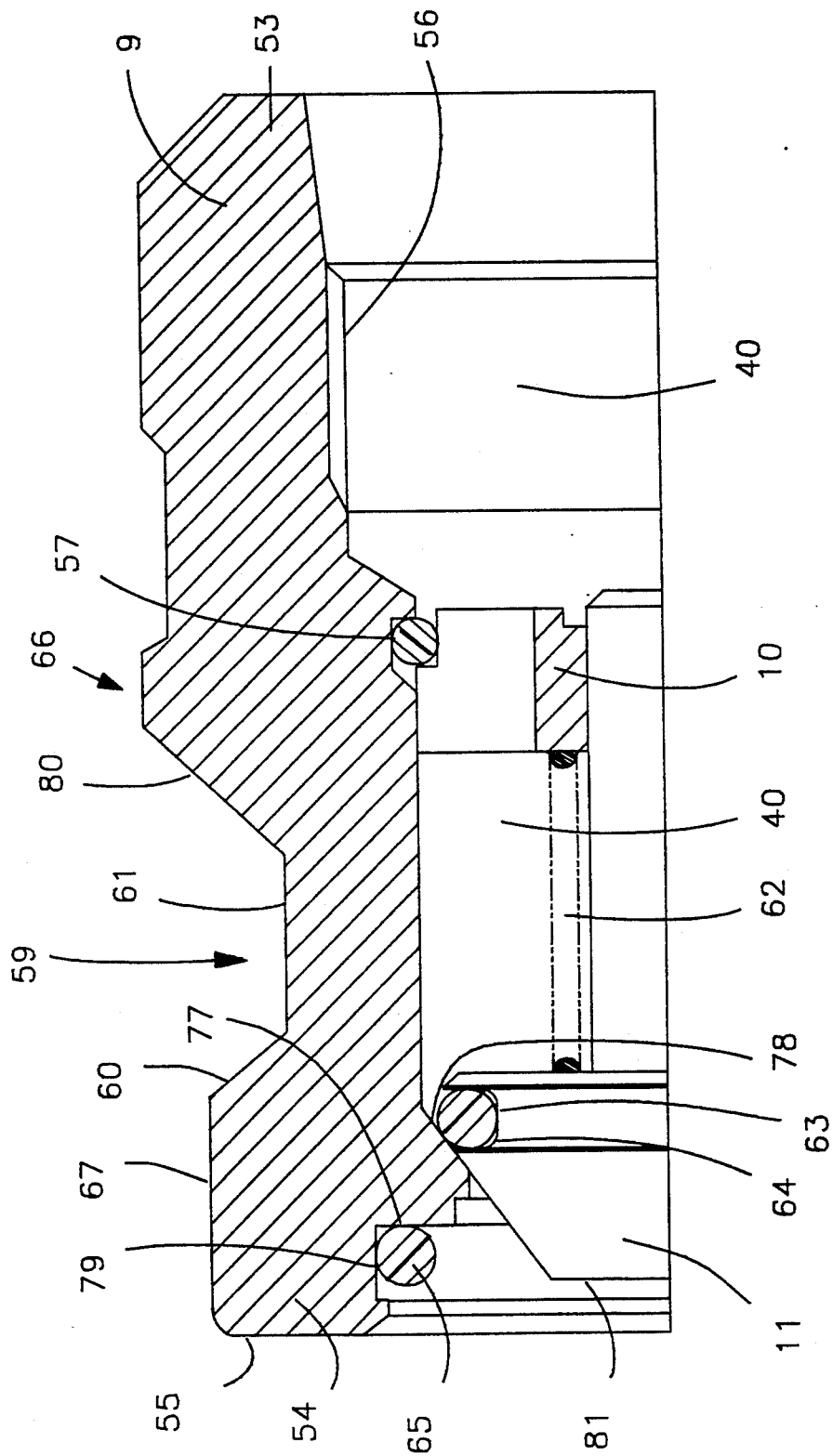
FIG. 3 is a half-sectional view of the nipple disengaged.

FIGS. 1 and 4 illustrate the coupler and the nipple engaged. FIG. 2 illustrates the coupler prior to engagement. FIG. 3 illustrates the nipple prior to engagement. As the nipple enters the coupler no movement of the check valve 11 occurs. As the nipple 66 enters the coupler 15, shoulder 77 and face 55 of nipple body 9 engage the coupler valve 12 and the face 20 of the sliding sleeve, respectively. Coupler valve 12 and sliding sleeve 4 are urged toward the first end portion 16 of the coupler. As coupler valve 12 is urged toward the first end of the coupler, ports 39 are exposed to whatever pressure may be available to the adaptor. Additionally, as sliding sleeve 4 is urged toward the first end portion 16 of the coupler 15, second balls 7 are released from first plateau 73 of the sliding sleeve and into engagement with the first shoulder 29 and second plateau 74 of the sliding sleeve. As the second balls 7 are released from the first plateau 73, second ball housing shoulder 21 of the locking sleeve 5 simultaneously urges the second balls 7 into engagement with the first shoulder 29 and second plateau 74 of sliding sleeve 4.

Additionally, during coupling and simultaneously with the release of the second balls 7, locking sleeve 5, under the influence of locking sleeve spring 38, is urged toward the second end portion 17 of coupler 15. Then the first balls 6 engage the first wall 60 of the circumferential notch 59 and first locking shoulder 33.

In the condition of engagement with little or no pressure available to the coupler, sliding sleeve spring 18 will urge sliding sleeve 4 in the direction of the second end portion of the coupler creating an approximate gap 70 of 0.015 inches between the face 26 of the retainer and the third shoulder 27 of the sliding sleeve. Additionally, there will be an approximate gap 69 of 0.035 inches between the first shoulder 23 of the retainer and the second shoulder 19 of the body. See, FIG. 7. After insertion, the coupler and the nipple are locked together but they are not locked under the influence of the pressure applied to the adaptor for the simple reason that there is little or no pressure present at this point in time. The first balls 7 are engaging the first locking shoulder 33. See, FIG. 7.

As the pressure source is applied to the adaptor, pressure applied to pressure bearing surface 37 of retainer 3 overcomes the resistance of sliding sleeve spring 18 and face 26 of retainer 3 is urged into engagement with third shoulder 27 of sliding sleeve 4 transmitting the force of said pressure source to nipple body 9 and the gap 70 between the face 26 of the retainer and the third shoulder 27 of the sliding sleeve is eliminated. See, FIG. 8. The force transmitted through the sliding sleeve and the first wall 60 of the circumferential notch 59 of the nipple urges the first balls 6 into engagement with the first locking diametrical surface 31 and the second locking shoulder 33 of the locking sleeve 5. The nipple and the coupler are now pressure locked together.

When desired, the coupling is easily separated. The sequence for disconnection is as follows: pressure is removed or reduced to a specified level at the adaptor, bumper 8 is then retracted in a direction of the first end portion 16 of the coupler releasing balls 6 and 7, which, in turn, permits separation of the coupler and nipple.

The present invention meets the standards as set forth by the Consolidated Natural Gas Industry. Those standards are among others NGV1-Class 2.

Depending upon the spring rates employed for the various springs used in the present invention, it will be obvious to those skilled in the art that the present invention contemplates pressure locking the coupling at one pressure, followed by opening of the check valve.

It will thus be seen that a coupling for accomplishing the objectives of the invention has been provided. The objectives are to permit transportation of a fluid medium such as a gas which ensures that the coupling parts will not become disconnected while transporting gaseous medium therethrough. This coupling includes a coupler or female part and a nipple or male part moveable between coupled and uncoupled positions as illustrated in the figures. Walls define fluid passages through both coupler parts and detents in the form of ball members act between the coupler and the nipple to hold the same together when the parts are in coupled position.

The locking retainer 3 is provided as part of the coupler and is moveable back and forth between lock and unlocked positions. A first end of the retainer is exposed to fluid pressure when pressure is present in the coupler and this pressure exerts a force on the retainer tending to move the retainer to the so called locked position.

The retainer functions to urge the ball type detents to a firmly locked position to prevent separation of the coupler and nipple. As seen, the so called first ball detents 6 are carried in openings of the coupler and a recess or groove is provided in the nipple which receives one portion 95 of the first ball detents and a locking sleeve which is moveable axially between first and second positions surrounds second portions 96 of the first ball detents. Movement of the retainer to locked position exerts a force on the first ball detents to hold the second portions of the same into firm engagement with the locking sleeve to lock the coupler and the nipple together.

A sliding sleeve which is axially moveable between first and second positions is positioned between the retainer and the nipple in the coupled condition of the coupling. Second ball type detents 7 are carried in the coupler and have first 98 and second spaced portions 99 so that the sliding sleeve in a first position engages the first portion 98 of the second ball detents to hold the second portions 99 of the second ball detents in engagement with the locking sleeve to hold the locking sleeve in its first position. See, FIG. 2.

The sliding sleeve in its second position (FIGS. 1, 4, 7 and 8) permits radial inward movement of the second detents which, in turn, permits movement of the locking sleeve to its second position. The movement of the retainer to lock position (FIGS. 4 and 8) causes the second end portion of the retainer to engage the sliding sleeve which engages the nipple which in turn exerts a locking force on the first ball detents to hold them into engagement with the locking sleeve and to hold the two coupling parts firmly and reliably together.

First 38 and second 18 springs respectively act on the locking sleeve and the locking retainer to urge these respective components in a given direction. The second spring has been previously referred to herein as the sliding sleeve spring 18, and the first spring has been previously referred to herein as the locking sleeve spring 38. First and second valve members, previously referred to herein as the coupler valve 12 and the check valve 11, are provided respectively in the coupler and the nipple and each are moveable between open and closed positions. Additionally, springs, previously referred to as coupler valve spring 13 and check valve spring 62, are provided which normally urge the first 12 and second 11 valve members to the closed positions. The first valve member in the coupler is opened by engagement with the nipple when the parts are coupled and when coupled fluid pressure in the coupling causes the valve member in the nipple to move to the open position.

A protective bumper member 8 surrounds the coupler and particularly the locking sleeve 5 with which it is connected and with which it moves axially. A first end portion of the bumper has a radially inwardly extending portion which covers the axial end of the coupler at its end where the nipple enters the coupler in the coupling process. The bumper member is preferably made of a synthetic resinous material and is for the purpose of protecting the end of the coupler when disassembled from the nipple when a user might inadvertently drop it on a cement walkway or by similar means of abuse.

While the invention has been described in combination with embodiments thereof, it is evident that many alternatives, modifications and variations will be apparent to those skilled in the art in light of the foregoing description. Accordingly, it is intended to embrace all such alternatives, modifications and variations that fall within the spirit and scope of the appended claims.

What is claimed is:

1. A coupling for transporting a fluid medium comprising a coupler and a nipple moveable between coupled and uncoupled positions, first wall means defining a first fluid passage through said coupler, second wall means defining a second fluid passage through said nipple, first detents acting between said coupler and said nipple to hold same together in said coupled position, a locking retainer in said coupler having first and second end portions and moveable between lock and unlock positions, said first end portion of said retainer being exposed to fluid pressure when present in said coupler tending to move said retainer to lock position, means acting between said second end portion of said retainer and said first detents whereby when said retainer is moved to lock position said first detents are locked in position to hold said coupler and nipple together.

2. A coupler as claimed in claim 1 wherein said first detents are carried in openings in said coupler and have first and second spaced portions, a recess in said nipple receiving said first portion of said first detents, a locking sleeve movable axially between first and second positions and surrounding said second portion of said first detents, said movement of said retainer to lock position exerting a force on said first detents to hold said second portion of said first detents into engagement with said locking sleeve to lock said coupler and nipple together.

3. A coupling as claimed in claim 2 wherein a sliding sleeve axially movable between first and second positions and having first and second end portions is positioned between said retainer and nipple in the coupled condition of said coupling, second detents carried in said coupler and having first and second spaced portions, said sliding sleeve inn said first position engaging said first portion of said second detents to hold said second portions of said detents in engagement with said locking sleeve to hold said locking sleeve in said first position, said sliding sleeve in said second position engaging said first portion of said second detents to permit radial inward movement of said second detents and to permit movement of said locking sleeve to said second position, .said movement of said retainer to lock position causes said second end portion of said retainer to engage said sliding sleeve which engages said nipple which exerts a locking force on said first detents to hold same into engagement with said locking sleeve.

4. A coupling as claimed in claim 3 wherein said first and second detents are spherical in shape.

5. A coupling as claimed in claim 3 wherein a first spring urges said locking sleeve toward said second position, and a second spring between said locking retainer and said sliding sleeve urges said locking retainer and said sliding sleeve apart.

6. A coupling as claimed in claim 2 wherein first and second valve members are provided respectively in said coupler and nipple and each are movable between open and closed positions, means normally urging said first and second valve members to closed position, movement of said coupler and nipple to coupled position causes said nipple to engage said first valve member in said coupler and move same to said open position, fluid medium pressure in said coupling causing said second valve member in said nipple to move to open position.

7. A coupling as claimed in claim 6 wherein said movement of said nipple to coupled position causes said nipple to engage said sliding sleeve and move said sliding sleeve to said second position.

8. A coupling as claimed in claim 2 wherein a protective bumper member having first and second end portions surrounds said locking sleeve and is secured to and moves axially therewith, said first end portion of said bumper member has a radially inwardly extending portion which covers the axial end portion of the coupler at the end where the nipple enters the coupler.

9. A coupling comprising a coupler, said coupler including an adaptor, a coupler body, a coupler valve, a retainer, a sliding sleeve, a locking means, and a locking sleeve, said body affixed to said adaptor, said retainer disposed between said coupler valve, said adaptor, said sliding sleeve and said body, a nipple, said nipple engaging said sliding sleeve of said coupler, said locking means engaging said sliding sleeve, said nipple, and said locking sleeve preventing separation of said coupler and said nipple.

10. A coupling as claimed in claim 9 wherein: said locking means includes first and second balls, said coupler body includes a first ball housing and a second ball housing, said first and second balls moveable in said first and second ball housings, respectively, said locking sleeve includes first and second locking shoulders, said sliding sleeve includes a first shoulder located thereon; and, said nipple includes an exterior, said nipple includes a notch in said exterior, said notch includes a first wall, said nipple engaging said sliding sleeve and said coupler valve urging said coupler valve toward open position and orienting said second ball into engagement with said first shoulder of said sliding sleeve and said second shoulder of said locking sleeve, and orienting said first ball into engagement with said first locking shoulder of said locking sleeve and said first wall of said notch of nipple.

11. A coupling as claimed in claim 10 wherein said locking sleeve includes a first diametrical locking surface and a second diametrical locking surface.

12. A coupling as claimed in claim 11 wherein said retainer includes a first shoulder and said sliding sleeve includes a second shoulder, a sliding sleeve spring, said sliding sleeve spring disposed between said first shoulder of said retainer and said second shoulder of said sliding sleeve urging said sliding sleeve against said second ball and urging said second ball against said second locking shoulder of said locking sleeve and urging said first wall of said notch of said nipple member against said first ball urging said first ball against said first locking shoulder of said locking sleeve.

13. A coupling as claimed in claim 12, said coupler connected to a pressure source, wherein: said retainer includes a pressure bearing surface and a face, and said sliding sleeve includes a third shoulder, said pressure source acting upon said pressure bearing surface of said retainer urging said face of said retainer toward and into engagement with said third shoulder of said sliding sleeve, said sliding sleeve transmitting the force of said pressure source against said first ball locking said coupler and nipple.

14. A coupling as claimed in claim 13 wherein said first ball engages said first diametrical locking surface of said locking sleeve.

15. A coupling as claimed in claim 14 wherein said coupler includes a first end portion and a second end portion, said body of said coupler includes a first shoulder and said locking sleeve includes a spring shoulder, a locking sleeve spring disposed between said first shoulder of said body and said spring shoulder of said locking sleeve, said locking sleeve spring urging said locking sleeve toward said second end portion of said coupler.

16. A coupling as claimed in claim 15 wherein said coupler includes a bumper, said bumper affixed to said locking sleeve.

17. A coupling as claimed in claim 15 wherein said coupling includes a plurality of first and second balls.

18. A coupling as claimed in claim 17 wherein said coupler valve includes first and second end portions, said first end portion of said coupler valve includes a shoulder residing thereon, said adaptor including first and second shoulders, said body of said coupler includes a second shoulder, said retainer includes a second shoulder, a coupler valve spring, said coupler valve spring disposed between said first shoulder of said adaptor and said shoulder of said first end portion of said coupler valve, said coupler valve spring urging said coupler valve against said nipple, said pressure source urging said retainer away from said second shoulder of said adaptor but not against said second shoulder of said body.

19. A coupling as claimed in claim 18 wherein said coupler valve includes a port, said nipple includes first and second end portions, and said nipple includes a check valve, a check valve spring, said check valve spring urging said check valve toward said second end of said nipple closing said check valve without sufficient pressure applied, said check valve having a face, said pressure when sufficient on said face of said check valve opening said check valve and urging said check valve toward said first end of said nipple permitting flow through said coupling.

* * * * *

UNITED STATES PATENT AND TRADEMARK OFFICE
CERTIFICATE OF CORRECTION

PATENT NO. : 5,323,812
DATED : June 28, 1994
INVENTOR(S) : Wayne Wilcox

It is certified that error appears in the above-indentified patent and that said Letters Patent is hereby corrected as shown below:

Item [75],
Title Page, after "Inventor:", delete "Wilcox Wayne"

and insert --Wayne Wilcox-- .

Signed and Sealed this

Twentieth Day of September, 1994

Attest:

BRUCE LEHMAN

*Attesting Officer*    *Commissioner of Patents and Trademarks*